Nov. 12, 1963 F. H. CLUTE 3,110,286
FORCED AIR VENTILATING FLOOR FOR POULTRY HOUSES
Filed Feb. 27, 1961 2 Sheets-Sheet 1

INVENTOR.
Francis H. Clute
BY
Hovey Schmidt Johnson & Hovey
ATTORNEYS.

Nov. 12, 1963    F. H. CLUTE    3,110,286
FORCED AIR VENTILATING FLOOR FOR POULTRY HOUSES
Filed Feb. 27, 1961    2 Sheets-Sheet 2
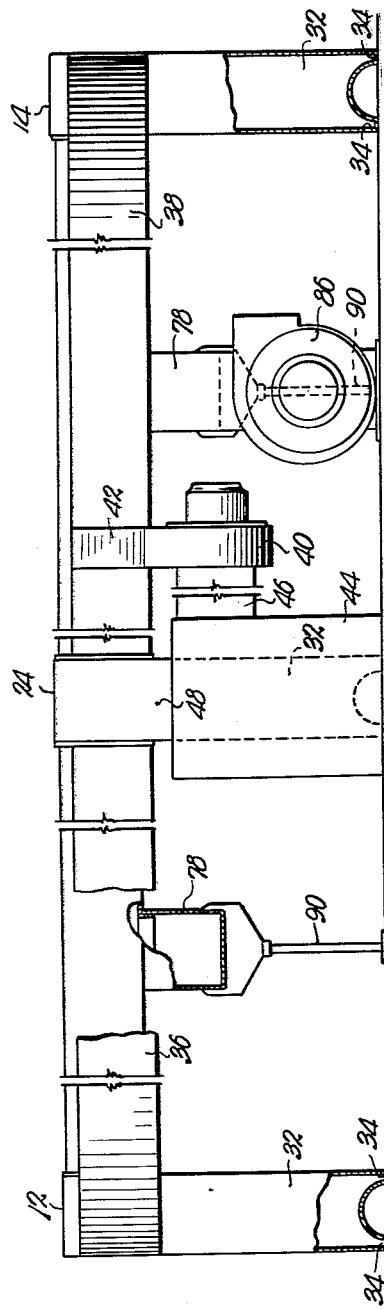
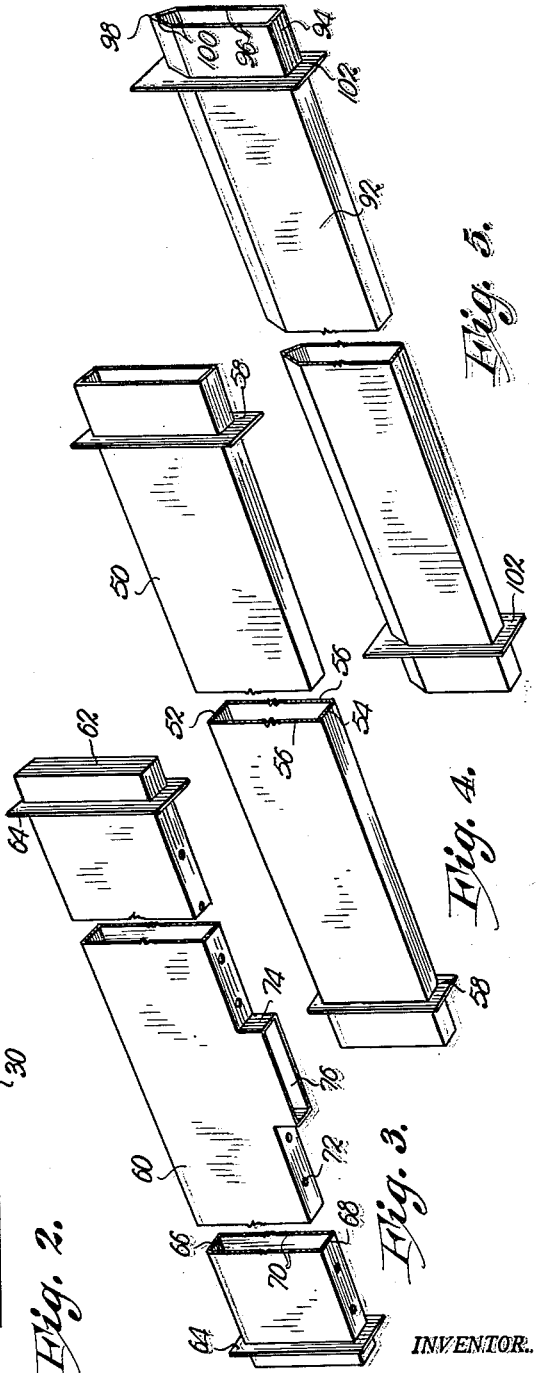
INVENTOR.
Francis H. Clute
BY
Hovey, Schmidt, Johnson & Hovey
ATTORNEYS.

United States Patent Office 3,110,286
Patented Nov. 12, 1963

3,110,286
FORCED AIR VENTILATING FLOOR FOR POULTRY HOUSES
Francis H. Clute, Rocky Ford, Colo.
Filed Feb. 27, 1961, Ser. No. 92,085
9 Claims. (Cl. 119—22)

This invention relates to a floor for use in a poultry house or the like, and more particularly to a floor provided with means for conveying conditioned air to the region within which the poultry is normally disposed so as to maintain the air surrounding the poultry at substantially predetermined temperatures, depending upon the season of use thereof.

The present invention provides means for conveying conditioned air, namely, heated air or cooled air, through tubes which serve as the supporting means for poultry so that the air surrounding the tubes and thereby the poultry, is conditioned, depending upon the season of the year. As is well known, a number of forms of poultry are subject to seasonal temperature variations and as a result contact several maladies which effect the growth of the poultry, as well as the egg laying capacities thereof. By virtue of the construction of the present invention this problem can be circumvented by heating the area in which the poultry is disposed during seasons having cold temperatures, and for cooling the region during seasons having warm temperatures whereby the comfort of the poultry is assured and the aforementioned deleterious effects of seasonal temperature variations on the latter are substantially eliminated.

It is therefore, the primary object of the present invention to provide a floor for use in a poultry house which conditions the air within the house or enclosure containing the poultry so that the comfort of the poultry will be assured and the maladies which are characteristic thereto will be substantially eliminated.

It is another object of the present invention to provide a floor including a plurality of tubular members for conveying conditioned air through the latter to thereby condition the air surrounding the members and thereby, poultry supported by the floor.

Another object of the present invention relates to the provision of a floor comprised of a plurality of spaced, elongated, metallic tubes for conveying conditioned air from the discharge end of a blower to the suction end thereof after passing through a means for conditioning the air, whereby the floor may be easily and effectively cleaned periodically without absorbing the moisture utilized from the cleansing solution to thus prolong the life of the members constituting the floor.

A further object of the present invention is the provision of a floor for conditioning the air within an enclosure for housing poultry, whereby the air within the tubes conditions the air surrounding the tubes to thereby condition the body temperatures of poultry disposed above the floor and supported by the latter.

Another object of the present invention is the provision of a floor having a duct and a plurality of elongated, tubular elements in fluid communication with the duct, whereby when suction means is operably coupled to the duct, the contaminated air is removed from the region in the vicinity of the floor to thereby remove the odors associated with poultry from the housing containing the floor.

Other objects of the present invention will become apparent as the following specification progresses, reference being had to the accompanying drawings, wherein:

FIG. 2 is a cross-sectional, side elevational view of the floor illustrated in FIG. 1;

FIG. 3 is a fragmentary, cross-sectional, perspective view of the ventilating tube which forms a part of the present invention;

FIG. 4 is a fragmentary, cross-sectional, perspective view of a conditioning tube, which together with the tube of FIG. 3 forms a part of the present invention; and FIG. 5 is another embodiment of the tube illustrated in FIG. 4, and is a perspective view of a tube to be utilized with poultry in the early stages of development.

Figure 1:
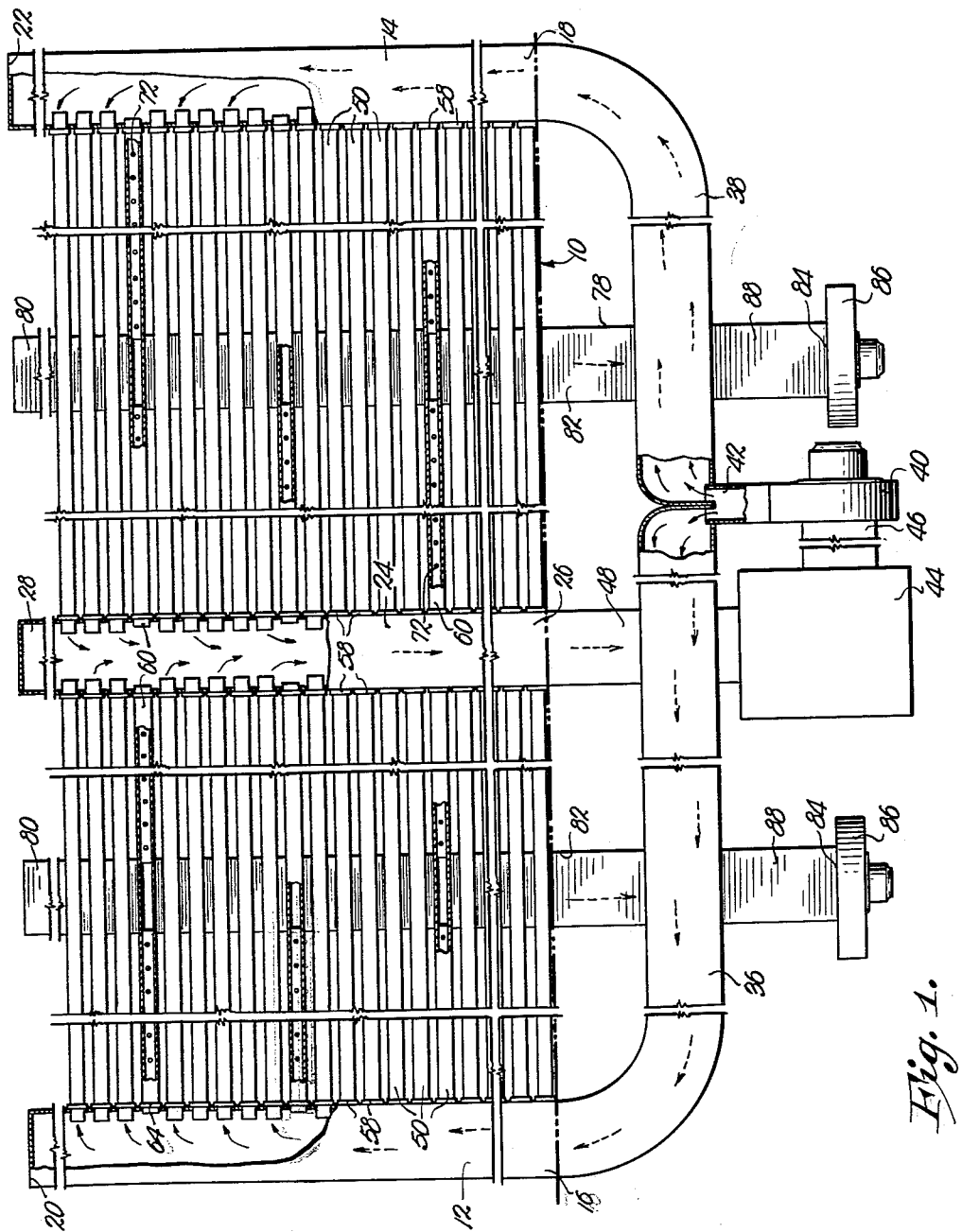
FIGURE 1 is a cross-sectional, plan view of the floor which forms the subject of the present invention.

The floor which forms the subject of the present invention is broadly denoted by the numeral 10 and comprises a pair of substantially parallel end conduits 12 and 14 which are open at the ends 16 and 18 thereof respectively, and closed at the ends 20 and 22 thereof respectively.

Conduits 12 and 14 are transversely square and are provided with top and bottom walls and a pair of opposed side walls, the walls being of a sheet material of any suitable type. One of the side walls of each of conduits 12 and 14 is provided with a plurality of longitudinally spaced openings therethrough for receiving a plurality of tubes hereinafter described for forming the floor 10. A central conduit 24 is disposed between conduits 12 and 14 and is substantially parallel therewith. Conduit 24 is open at the end 26 thereof and closed at the end 28 thereof in the manner set forth above for conduits 12 and 14.

Conduits 12, 14 and 24 are spaced above a base 30 by means of a plurality of supports 32, the latter being illustrated in FIG. 2 of the drawings. Supports 32 are provided at the lowermost ends thereof with spaced legs 34 formed by removing a portion of supports 32 at the lowermost ends thereof. Thus, moisture is prevented from contacting the entire lowermost surface of supports 32 to thereby minimize the effects of moisture to the life of the supports 32. Base 30 may conceivably be the bottom surface of an enclosure such as a poultry house so that conduits 12, 14 and 24 are spaced above base 30 by virtue of supports 32.

Central conduit 24 is, like conduits 12 and 14, transversely square and provided with top and bottom walls and a pair of opposed side walls, the latter having openings therein aligned with the openings in the side walls of conduits 12 and 14 for mounting the tubes hereinafter described for forming floor 10. It is clear that supports 32 engage the bottom walls of conduits 12, 14 and 24 for supporting the latter.

Each end conduit 12 and 14 is connected by transverse conduits 36 and 38 to a blower device 40 positioned in horizontal spaced relationship to conduits 12 and 14, and adjacent to the center line of central conduit 24. Transverse conduits 36 and 38 are in fluid communication with the discharge outlet 42 of device 40 for directing air into the open ends 16 and 18 of conduits 12 and 14.

Device 40 is mounted at one side of a mechanism 44 for conditioning air, the latter including a heating and cooling apparatus for alternately heating and cooling the air flowing into the suction inlet 46 of device 40. Mechanism 44 is operably coupled to the open end 26 of conduit 24 by means of a tubular extension 48 positioned below transverse conduit 36 to clear the latter.

Mechanism 44 is positioned and supported on base 30 to thereby mount device 40 in spaced relationship to the latter. Thus, air enters central conduit 24 and passes into mechanism 44 where the same is conditioned. Air passes out of mechanism 44 into the suction inlet 46 of device 40 and then passes outwardly from the latter through the outlet 42 thereof into transverse conduits 36 and 38 and thereby into conduits 12 and 14.

To interconnect conduits 12 and 14 and place the same in fluid communication, a plurality of conditioning tubular members 50 are provided. Each member 50 is transversely rectangular and is provided with a top wall 52 spaced from a bottom wall 54 and a pair of side walls 56 interconnecting top and bottom walls 52 and 54. Members 50 are open at the ends thereof, which ends are positioned within the openings in the corresponding side walls of conduits 12, 14 and 24 to form a grid of tubes which are horizontally spaced from each other.

As illustrated in FIG. 4, each member 50 is provided with a flange 58 thereon and circumscribing the outer periphery thereof, the flanges 58 being adapted to abut the corresponding side walls of conduits 12, 14 and 24 to prevent the travel of members 50 inwardly into the conduits. In addition, flanges 58 serve as means for sealing the junction between members 50 and the corresponding conduits. The top walls 52 of members 50 serve as supporting surfaces for poultry along with the top walls of conduits 12, 14 and 24. It is evident that air may pass between members 50 and circulate around the poultry and further, the droppings from the poultry may gravitate between members 50 to the base 30 therebelow.

Members 50 provide air passage means between conduits 12 and 14 and central conduit 24 when device 40 is actuated. Since mechanism 44 is essentially across the path of flow of the air, the air is conditioned as the same circulates through the conduits and through device 40.

As the conditioned air passes through members 50, the air surrounding the latter is effectively conditioned by virtue of the thermal interchange relationship between members 50 and the air surrounding the same. Thus, the air surrounding members 50 may be heated during winter months and cooled during the summer months so that the poultry supported by the topwalls 52 of members 50 may experience the variation in temperature of the air in the region surrounding members 50.

To ventilate the area below members 50, a plurality of tubular elements 60 are provided and supported by conduits 12, 14 and 24 in spanning relationship to the latter. Elements 60 are disposed between pairs of members 50 in the manner set forth in FIG. 1, and are closed at the ends thereof by end walls 62 illustrated in FIG. 3 of the drawings. Each element 60 is provided with flanges 64 adjacent the ends thereof for limiting the inward travel of the elements 60 relative to the openings in the corresponding conduits 12, 14 and 24. In addition, each element 60 is transversely rectangular and substantially of the same dimensions as members 50.

Element 60 is provided with a top wall 66, a bottom wall 68 and a pair of side walls 70 interconnecting top and bottom walls 66 and 68. Top wall 66, along with the top wall 52, serves as a support for poultry. Bottom wall 68 is provided with a plurality of perforations 72 which place the interior of the elements 60 in fluid communication with the area beneath members 50 and thereby, elements 60.

Each element 60 is further provided with a projection 74 secured to the bottom wall 68 thereof, projection 74 having an opening 76 therein for placing the interior of element 60 in fluid communication with an elongated duct 78 when projection 74 is positioned within an opening in the latter.

A duct 78 is disposed between conduit 12 and conduit 24 and also between conduit 14 and conduit 24, ducts 78 being substantially parallel with conduits 12, 14 and 24 but having a longitudinal axis disposed below the longitudinal axes of conduits 12, 14 and 24. Each duct 78 is closed at one end 80 thereof and is open at the other end 82 thereof. Ends 82 are placed in fluid communication with the suction inlets 84 of a pair of blowers 86 by virtue of a pair of tubular stretches 88, as best seen in FIG. 1.

Blowers 86, as shown in FIG. 2, are supported on base 30, and ducts 78 are supported in spaced relationship to base 30 by standards 90 so that the floor 10 is maintained in spaced relationship to base 30. Upon actuation of blowers 86, a suction is created within ducts 78 and thereby, elements 60, to thereby create a flow of air from the region below elements 60 through perforations 72, into element 60 and out of the latter through openings 76.

In operation, device 40, as well as blowers 86, are actuated to create the various air flows set forth above, so that air flows into members 50 and elements 60. Upon the actuation of mechanism 44, which may be operably coupled to a source of electrical power, air is conditioned as the same flows through device 40 and into conduits 12, 14 and 24. If the air is heated by mechanism 44, the air surrounding members 50 is also heated by virtue of the thermal interchange relationship between members 50 and the surrounding air. If the air is cooled by mechanism 44, the air surrounding members 50 is also cooled by virtue of the aforesaid thermal interchange relationship. Thus, floor 10 may be utilized throughout the entire year to condition the air surrounding members 50 depending upon the seasonal requirements.

In addition, the area below the floor 10 may be effectively ventilated by virtue of elements 60, ducts 78 and blowers 86, the latter being positioned to exhaust the air therefrom outside of the housing within which floor 10 is disposed. The arrows in FIG. 1 indicate the directions of air flow and illustrate the passage of air through members 50 and elements 60 for performing the conditioning and ventilating functions set forth above.

If it is desired to utilize floor 10 with poultry in the early stages of development, members 50 may be replaced by tubular members 92 having a bottom wall 94, a pair of side walls 96, and a top wall 98 is formed from a pair of converging strips 100 which are interconnected at the uppermost edges thereof. Thus, for example, baby chickens may more effectively be supported by the uppermost edges of strips 100 than if top wall 52 of member 50 were utilized. Members 92 are each provided with flanges 102 for the same reasons as member 50.

It is conceivable that the members 50 and 92, and elements 60, be constructed of a suitable sheet material such as aluminum, so that the deleterious effects of bacteria, mites, and other harmful insects, is substantially eliminated since these creatures are unable to hibernate as they do in wooden floors which are conventionally used in the floors of poultry houses. In addition, the present floor 10 is adapted for use with positive pressures, as well as negative pressures with no effect on the internal structure thereof.

If it is desired to direct fresh air into the poultry house, the action of blowers 86 is reversed to force air into ducts 78 and thence out through perforations 72 into the area beneath floor 10.

By virtue of the present construction, warm air is directed upwardly to the underside of the poultry for more effective comfort for the latter, whereas in conventional structure, air was directed from above and was unable to penetrate the feathers of the poultry to effect the body temperatures of the latter.

Floor 10 is much more easily cleaned than the structures heretofore utilized as floors for poultry houses, since water may be sprayed over the upper surfaces of members 50 and elements 60 to effectively clean the same without the soaking by members 50 and elements 60 of the water used for cleaning purposes.

Having thus described the invention, what is claimed as new and desired to be secured by Letters Patent is:

1. In a floor for a poultry house, a pair of spaced, horizontally disposed conduits; grid means for placing said conduits in fluid communication and disposed for providing a continuous air passage therewith, said grid means including a plurality of spaced, elongated, tubular members presenting air spaces therebetween, disposed in thermal interchange relationship to the air in the region between said conduits and surrounding said members for treating the air in said region responsive to the flow of conditioned air through said conduits and thereby through said tubular members; means operably coupled with said conduits for creating a flow of air through said air passage;

and means in the path of said flow for conditioning the air in the latter.

2. In a floor as set forth in claim 1, wherein is included support means secured to said conduits beneath the latter and adapted to be disposed upon a base for mounting said conduits and thereby said members in vertical spaced relationship to said base.

3. In a floor as set forth in claim 1, wherein each of said conduits is provided with an elongated wall having a plurality of longitudinally spaced openings therein, said tubular members being provided with open ends and removably disposed on said conduits with said open ends extending into the corresponding openings of said conduits.

4. In a floor as set forth in claim 3, wherein each of said members is provided with flange means thereon adjacent each end and engageable with the respective conduit thereof for limiting the travel of said member within said corresponding openings.

5. In a floor as set forth in claim 1, wherein each of said members is provided with a top wall providing a supporting surface for poultry.

6. In a floor as set forth in claim 2, wherein is included an elongated duct, a plurality of spaced, perforated, tubular elements positioned in said region in fluid communication with said duct with the perforations of the elements facing downwardly, and means for creating a flow of air through said duct in one direction, whereby air from the area below said region is forced into said elements through the perforations thereof and into said duct to thereby ventilate said area.

7. In a floor as set forth in claim 6, wherein said duct is located below said members and each of said elements is positioned between a pair of respective members.

8. In a floor as set forth in claim 6, wherein each of said elements is provided with a bottom wall having said perforations therein and a top wall providing a supporting surface for poultry.

9. In a floor as set forth in claim 8, wherein said elements span the distance between said conduits and are supported thereby, and wherein is included supporting apparatus secured to said duct and adapted to be disposed on a base for mounting said duct in vertical spaced relationship to said base.

References Cited in the file of this patent

UNITED STATES PATENTS

| | | |
|---|---|---|
| 780,247 | Wilcox | Jan. 17, 1905 |
| 2,669,393 | Schleicher | Feb. 16, 1954 |
| 2,702,503 | Wildhaber | Feb. 22, 1955 |
| 2,726,593 | Lahti | Dec. 13, 1955 |